P. HUS.
FLOWER SUPPORT.
APPLICATION FILED MAY 7, 1912.
1,055,914.
Patented Mar. 11, 1913.
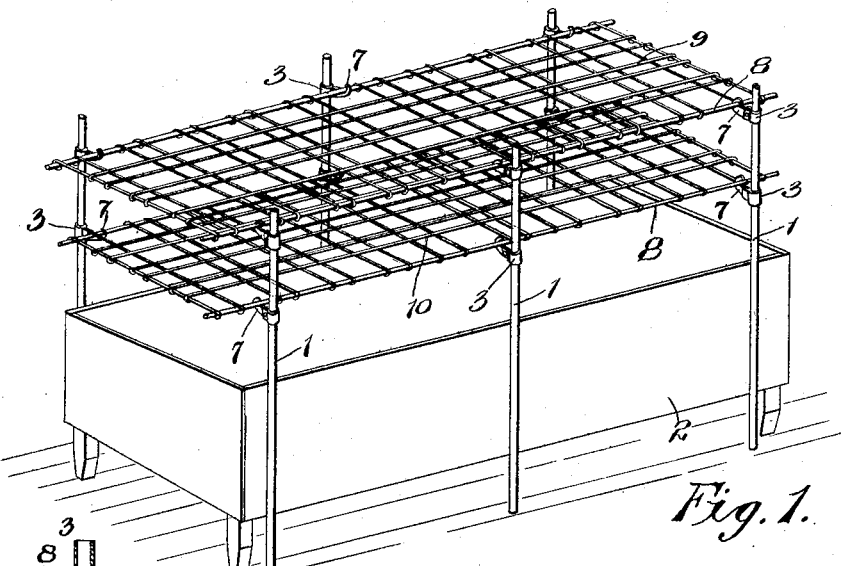
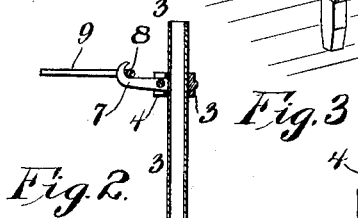
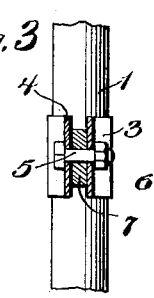
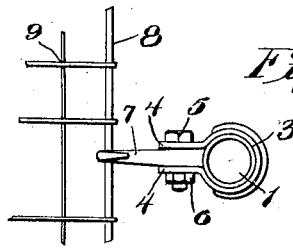
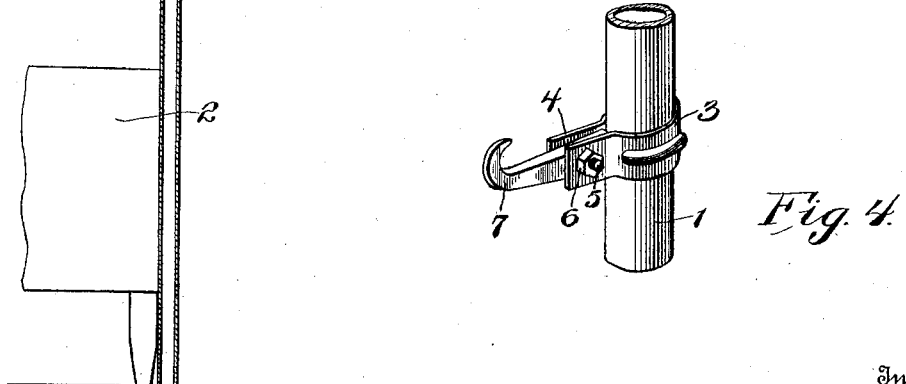
Witnesses
Wm. H. Mulligan.
Wm. J. Keith.
Inventor
Peter Hus.
By Victor J. Evans
Attorney
COLUMBIA PLANOGRAPH CO., WASHINGTON, D. C.

UNITED STATES PATENT OFFICE.

PETER HUS, OF RED OAK, IOWA.

FLOWER-SUPPORT.

1,055,914.  Specification of Letters Patent.  Patented Mar. 11, 1913.

Application filed May 7, 1912. Serial No. 695,685.

*To all whom it may concern:*

Be it known that I, PETER HUS, a subject of the Queen of the Netherlands, residing at Red Oak, in the county of Montgomery and State of Iowa, have invented new and useful Improvements in Flower-Supports, of which the following is a specification.

The present invention relates to supports for growing flowers.

In carrying out my invention I propose to provide flower benches or beds of hot houses with simple and effective means for supporting the stems of the flowers during the growth of the flowers to retain the stems straight, as well as to support the bloom of the stem.

I also aim to provide a device of this class comprising woven or reticulated members through which the stems of the plant or flower are adapted to project and to be supported thereby, the said members being vertically adjustable to compensate for the growth of the flowers or plants.

A further object of the invention is the provision of supports of this character which while light will be strong and durable and not susceptible to affection from the heat or climatic changes in the green-house.

With the above recited objects in view and others of a similar nature which will be more fully understood as the nature of the invention is developed, the improvement resides in the construction, combination and arrangement of parts set forth in and falling within the scope of the appended claims.

In the drawings, Figure 1 is a perspective view of the interior of a green-house having its beds or benches provided with my improvement. Fig. 2 is a vertical transverse sectional view taken upon a line of one of the posts of the support. Fig. 3 is a vertically transverse sectional view taken through the clip in a line with the bolt 5. Fig. 4 is a detail perspective view of one of the clamps and hooks. Fig. 5 is an enlarged plan view of a portion of one of the supports.

The improvement is primarily designed to support plants having comparatively long stems and which flower at their upper extremities, as for instance carnations. The support is adapted to be arranged within the green-house adjacent the flower boxes, but as the said boxes or benches are at all times under a strain from the earth as well as the flowers contained therein, the supports are not attached directly to the benches.

The numerals 1 designate a plurality of pipe members which are arranged adjacent the longitudinal edges of the flower bench 2. These posts are secured to the floor of the green-house in any desired or preferred manner and while they preferably contact with the sides of the benches, they do not, as aforesaid, connect therewith.

The numerals 3 designates a plurality of resilient clips which are adapted to surround the posts 1, and these clips are provided with offset arms or ears 4, the said ears being formed with registering openings and through which is passed a bolt 5 having a nut 6. Arranged between the ears 4 of each of the clips 3 is a hook 7, the said hook being also provided with an opening which registers with the opening in the ears and which also receives the bolt 5. By this arrangement the rounded or body portion of the clip 3 may be tightly compressed upon the post to sustain the said clip in a vertically adjusted position upon the post and at the same time retain the hooks 7 in a proper position to engage with the longitudinally extending end wires 8 of flower supporting frames 9 and 10. It is to be understood that any desired number of these frames may be employed, two being shown in the drawings, and each of the said frames is of a substantially similar construction. Each of the frames comprise the heavy side and end wires and a plurality of longitudinally as well as transversely extending lighter wires. The lighter wires are spaced to provide openings therebetween of varying sizes to accommodate the stalks or stems of flowers which also vary in size. The reticulated frames 9 and 10 are arranged one directly above the other so that all the stalks and branches of the flowers are effectively supported and the said flowers are trained to grow in a perfectly vertical position.

From an arrangement as above described it will be noted that I have provided a simple, cheap and effective support for training flowers, one which will prevent the falling or breaking of the plants and which will also effectively support the flowers of the plants. It will be noted that the device, being constructed from metal will not be susceptible to the moisture or climatic changes of the green-house, and furthermore that by constructing the end members of the support frames of heavy wires the frame is rendered strong and is prevented from bending.

Having thus described the invention, what I claim is:—

1. A flower support of the class described, including a plurality of vertically arranged posts, resilient clips upon the posts, hooks carried by the clips, frames adapted to be engaged by the hooks and each of the said frames comprising wire members having their outer end portions constructed of heavy wire and their said outer portions connected with transversely and longitudinally extending wires of a lighter gage than the end wires of the frame.

2. A flower support of the class described, including a plurality of vertically arranged posts, clips for the posts, each of said clips comprising split resilient members having extending arms, hooks arranged between the arms, members pivotally securing the hooks between the arms and compressing the clips upon the posts, and frames comprising each a wire mesh supported upon the hooks.

In testimony whereof I affix my signature in presence of two witnesses.

PETER HUS.

Witnesses:
JOHN W. SANDIN,
F. A. SMITH.

Copies of this patent may be obtained for five cents each, by addressing the "Commissioner of Patents, Washington, D. C."